United States Patent [19]
Inhofer

[11] 3,964,504
[45] June 22, 1976

[54] LEVELING VALVE

[75] Inventor: Harold G. Inhofer, Hopkins, Minn.

[73] Assignee: Integrated Power, Incorporated, St. Louis Park, Minn.

[22] Filed: May 7, 1974

[21] Appl. No.: 467,655

[52] U.S. Cl. .................................... 137/39; 91/390; 91/419; 91/453; 91/461; 137/38; 137/625.61; 182/2; 182/19

[51] Int. Cl.[2] .................. B66F 11/04; F15B 13/042; F16K 11/00

[58] Field of Search ............. 91/390, 419, 415, 453, 91/367, 461, 304; 137/38, 625.62, 625.61, 625.6, 39, 46; 182/2, 19

[56] References Cited

UNITED STATES PATENTS

| | | | |
|---|---|---|---|
| 2,218,194 | 10/1940 | Freeman | 137/39 X |
| 2,961,001 | 11/1960 | Pippenger | 91/453 X |
| 3,397,915 | 8/1968 | Small et al. | 91/419 X |
| 3,415,021 | 12/1968 | Myers | 137/38 X |
| 3,437,010 | 4/1969 | Jacobi et al. | 91/419 X |
| 3,477,472 | 11/1969 | Mercier | 137/625.62 |
| 3,590,948 | 7/1971 | Milner | 182/2 |
| 3,756,262 | 9/1973 | Morrow et al. | 137/625.61 X |
| 3,768,374 | 10/1973 | Ito et al. | 91/419 |

FOREIGN PATENTS OR APPLICATIONS

| | | | |
|---|---|---|---|
| 1,426,471 | 11/1968 | Germany | 91/461 |
| 1,072,468 | 6/1967 | United Kingdom | 137/46 |

*Primary Examiner*—Irwin C. Cohen
*Attorney, Agent, or Firm*—James R. Cwayna

[57] ABSTRACT

A hydraulic valving mechanism for controlling an object in a normally level position such that upon a shifting of the same from level an actuating mechanism is driven to return the object to the desired level, such valving mechanism including a valve housing with control ports therein with a gravity responsive member therein to open and close selected ones of the ports depending upon the direction the same is shifted from level with the ports being interconnected to a main control valve for shifting of the same to direct fluid to the proper side of the actuating mechanism to return the object to its normal, level position.

4 Claims, 7 Drawing Figures

LEVELING VALVE

Various automatic devices for the control of attitude have existed in the prior art. To applicant's knowledge, most of these prior art devices were, what may be termed dual system devices in which a first unit is arranged to sense a change in position and relay this information to a second unit or system which will respond to this information to return the device to its desired position.

Applicant's device provides a system wherein the sensing unit includes a control and provides the control for the attitude shifting portion of the device. With this concept, it is only necessary to connect the normally provided attitude control lines to applicant's device and to mount applicant's device upon the unit to be controlled.

Applicant's unit provides a hydraulic control for the control of hydraulic fluid to the positioning device and the shifting of a control member within applicant's unit, due to gravity, will direct hydraulic fluid to the proper side of the positioning unit for actuation thereof and upon the proper return of the controlled device, the fluid will be stopped.

With applicant's unit, the responsiveness of the positioning device is controllable such that the controlled device will not tend to overcompensate and thus cause oscillation of the controlled device.

It is therefore an object of applicant's invention to provide an attitude control device for the positioning of an object and the maintenance of such desired positioning.

It is a further object of applicant's invention to provide an attitude control device which incorporates a hydraulic circuit including a hydraulically actuated position controlling device and a hydraulic controlling, level sensing device arranged to control the flow of hydraulic fluid to the position controlling device such that upon deviation from a predetermined level position, hydraulic fluid will be directed to the position controlling device for actuation thereof.

These and other objects and advantages will more fully appear from the accompanying description made in connection with the accompanying drawings, in which the same numerals are utilized to designate the same or similar parts throughout the several views, and in which.

Figure 1:
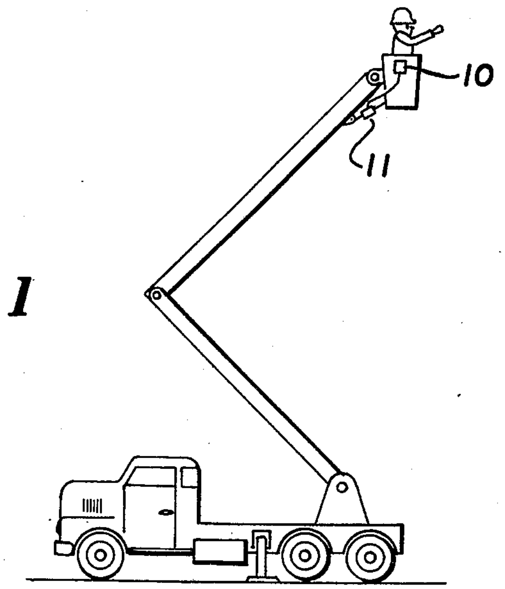
FIG. 1 illustrates a unit to which applicant's device may be affixed to maintain the attitude of the personnel carrying bucket.

In accordance with the accompanying drawings, applicant provides a positioning control device primarily designed to maintain an object in a level position by controlling a hydraulic positioning member. The control device is designated 10 and the positioning member is designated 11. The control device 10 is illustrated in FIG. 1 as controlling a personnel carrying extendable bucket wherein the bucket is free to swing on a pair of scissor-type arms. Obviously, the movement of the individual in the bucket may cause the unit to shift from a level position and it is this movement that applicant's device will compensate for. Applicant's device will automatically bring the bucket to a level position and maintain the same at this level position not only during the actual extended use thereof but also during upward lifting of the bucket by the scissored arms.

This is only an example of the uses of applicant's device and obviously many other similar uses are available and such uses may include the attitude control of devices in more than one plane.

As illustrated in FIG. 1, the control device 10 is normally mounted on the unit to be controlled and the positioning member 11 is a dual acting hydraulic piston having one end connected to one arm of the lifting mechanism with the other end connected to the unit to be controlled.

Figure 2:
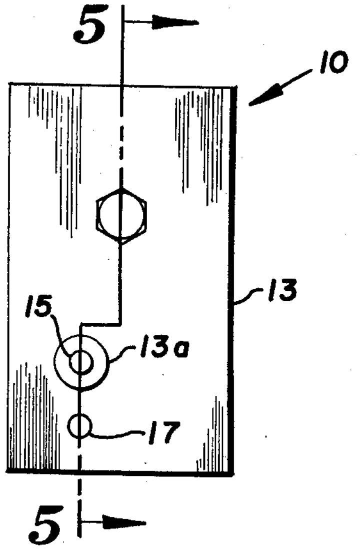
FIG. 2 is an end view of the actual control unit including the concepts of applicant's invention.
Figure 3:
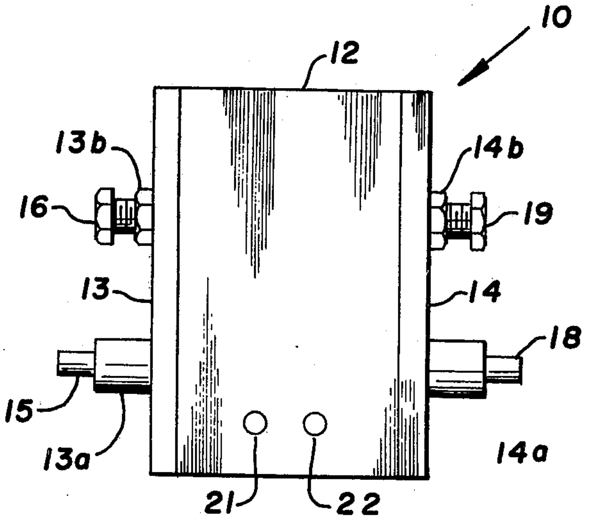
FIG. 3 is a side view thereof.
Figure 4:
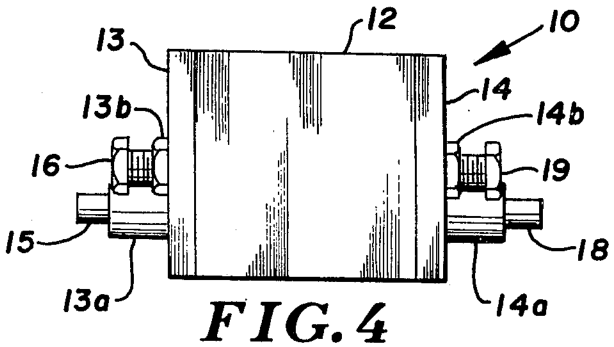
FIG. 4 is a top view thereof.
Figure 6:
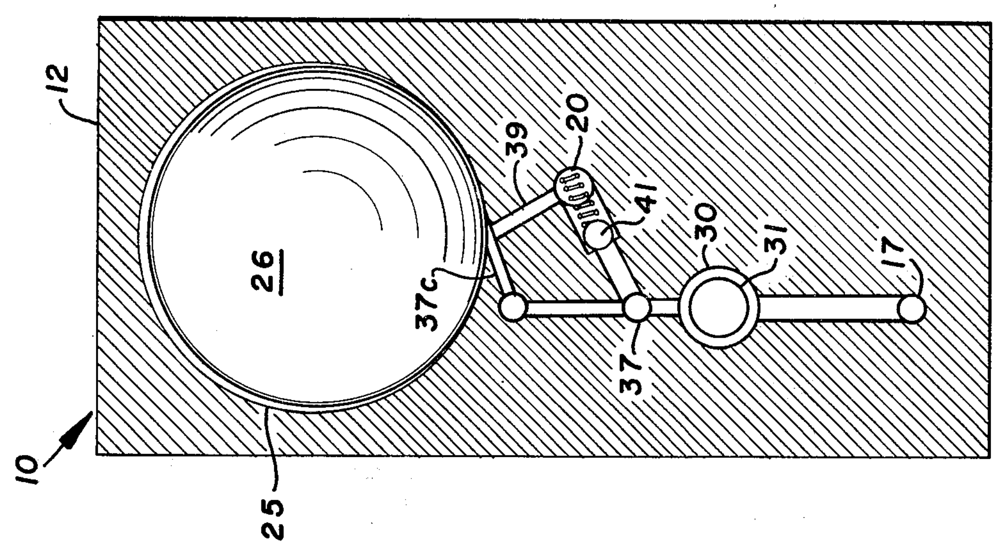
FIG. 6 is a vertical cross section taken substantially along Line 6—6 of FIG. 5; and, FIG. 7 is a schematic view of the hydraulic circuitry provided by the device.
Figure 5:
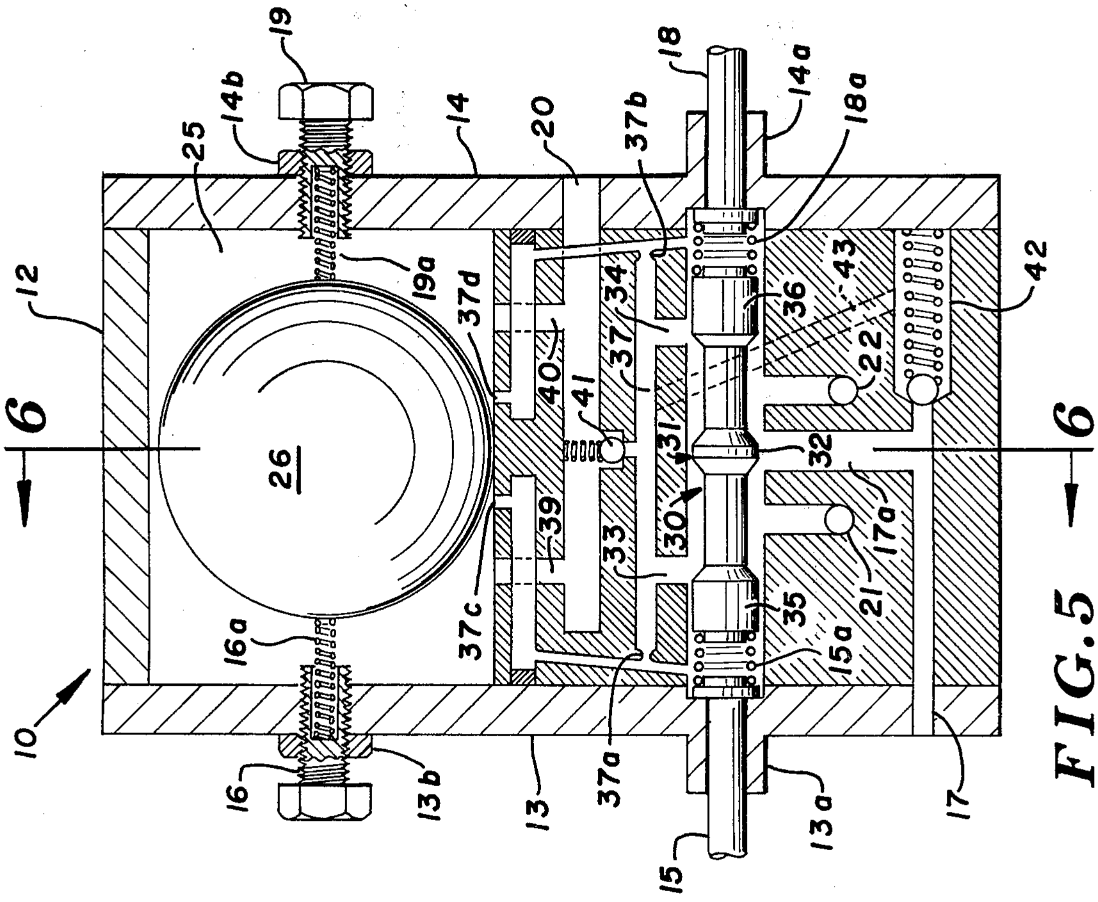
FIG. 5 is a vertical cross section taken substantially along Line 5—5 of FIG. 3.

The exterior configuration of the control device 10 is illustrated in FIGS. 2, 3 and 4 and as illustrated, the unit includes a central core structure 12 contained between a pair of end plates 13, 14 which must be sealingly joined to the core 12 to prevent fluid leakage of the unit.

The first end plate 13 includes a first outwardly directed boss 13*a* to permit a manual control rod 15 to pass therethrough, a second threaded boss 13*b* to receive an adjustment member 16 therein and an inlet passage formed therethrough designated 17.

The second end plate 14 includes a first outwardly directed boss 14*a* to permit a manual control rod 18 to pass therethrough, a second threaded boss 14*b* to receive an adjustment member 19 therein and an outlet passage formed therethrough designated 20.

The basic valving and control portions of the unit are contained in the core structure 12 but exteriorally through the same are passages 21, 22 arranged for connection to the respective ends of the hydraulic positioning member 11.

The central core structure, as stated, contains the operative valving mechanisms for the unit and the means for sensing any deviation from level is contained therein and includes a generally cylindrical passage 25 formed longitudinally through the core 12 and being closed by the end plates 13, 14. The adjustment members 16, 19 are arranged to extend into the ends of this passage. Arranged within passage 25 is a generally spherical valving member which is of slightly small diameter than that of passage 25 such that this spherical member 26 is free to roll within the passage 25 when the unit is tilted.

The adjustment members 16, 19 are provided with internally arranged spring members 16*a*, 19*a* which may be adjustably moved into contact with the spherical member 26 for controlling the movement thereof. Obviously these spring members 16*a*, 19*a* will operate as dampening members for partially controlling the movement of the valving member 26 to control the responsive movement thereof when the unit is tilted.

Movement of the spherical valving member 26 will ultimately control the flow of fluid from the inlet 17 to either of the passages 21, 22 for actuation of the positioning member 11 depending upon the direction of roll of the spherical member 26.

A plurality of passages and channels are provided in the core structure 12 for the flow of fluid therein.

The inlet 17, as illustrated, extends to a floating control spool area 30 having a control spool 31 therein, the entrance to this spool area being designated 17*a*.

The spool area 30 is arranged in alignment with the manual control rods 15, 18 and the control spool 31 is spring loaded between the ends of such rods 15, 18 by a pair of opposed biasing springs 15*a*, 18*a* such that the spool 31 will normally be centered therebetween. The spool member 31 includes a center valving member 32 of an enlarged size such that the same will seal within the spool area 30 when the same is shifted laterally from the inlet area 17*a* but which will normally permit flow therepast when the same is centered over such inlet area 17*a*.

A pair of outlets 33, 34 are provided for the direction of fluid from the spool area 30. The control spool 31 is provided with a pair of enlarged ends 35, 36 which are designed for sealing relation to the spool area 30 and these ends 35, 36 are spaced from the center area 32 of the control spool 31 such that fluid will normally be permitted to flow from the spool area 30 when the control spool 31 is centered. This type of valve is commonly termed as an open center spool. Movement of the spool 31 will close one of the outlets 33 or 34 from inlet fluid and rather, the inlet fluid will be directed to one of the passages 21 or 22 to direct the same to the proper side of the positioning member 11. At this same instance, fluid will be discharged from the opposite side of the positioning member 11 and will be returned through the passage 21 or 22 for ultimate discharge from the unit 10.

Figure 7:
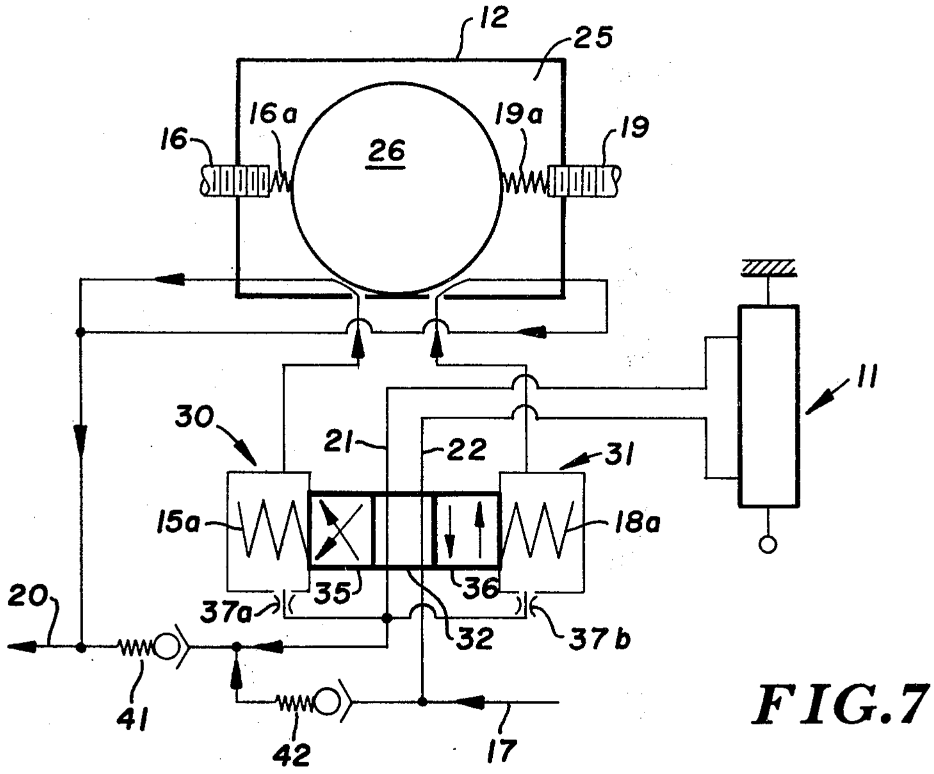

The spool member 31 then acts and basically is a 4-way, open center valve as illustrated in the schematic view of FIG. 7.

The outlets 33, 34 from the spool area 30 are directed to a common passage 37 and the ends of this passage will direct fluid to two areas. A metering orifice 37*a*, 37*b* is provided on each end of passage 37 and fluid passing therethrough is directed to an actuating area behind the ends 35, 36 of the control spool 31 and is also directed into inlet apertures 37*c*, 37*d* in position to be controlled by the movement of the spherical member 26. A second pair of apertures and passages 39, 40 are provided, longitudinally spaced from the inlet apertures 37*c*, 37*d* for the outlet of fluid from the passage 25 into the outlet passage 20 of the unit 10. This outlet will be discharge into a reservoir or the like for recirculation throughout the system.

A pressure relief control system is provided within the passage 37 and controls communication to the outlet passage 20 through a spring loaded or biased control member 41. This system will provide a relief to the pressure controlling the actuation of the spool member 31 and will also provide a relief for the pressure through the entire system. This latter pressure control system includes a circuit relief system communicating with the inlet 17 of the unit and which is designated 42. This system includes a biased relief system having communication through passage 43 to passage 37 and ultimately to the and through the relief system 41.

The operation of the unit is obviously to sense a position of the unit displaced from level, direct fluid to a positioning member that will return the unit to level and also to insure that the controlled movement of the same will not be accomplished by abrupt movements or overcompensating movements that would cause oscillation of the controlled device. With applicant's unit it will be necessary to provide a source of hydraulic pressure, the control unit connected into the hydraulic lines and the positioning unit which will receive fluid from the control unit and which fluid will be directed properly to the side of the positioning unit to reposition the controlled device.

When the control unit 10 is level, fluid will be equally directed to both sides of the positioning member 11 and will also be equally directed to the apertures 37*a*, 37*b* for equal pressure distribution to either end 35, 36 of the control spool 31. Fluid will, in this situation flow from the outlet 20 to the reservoir for the system.

When the valve is not level, the spherical member 26 tolls to the low side and covers either aperture 37*c*, 37*d* and thereby causes a pressure rise on that same side of the 4-way valve or spool 31 thus causing the same to move against the opposite spring and closing communication from the inlet to one side of the positioning member 11 while maintaining communication to the opposite side of the positioning member 11 with the inlet. The side of positioning member being closed will be in communication with the outlet 20 at this time. The spool and entire unit, including the spring loading aspect of the spherical member is designed such that at only slightly off-level, the spherical member will not completely cover orifices 37*c*, 37*d* and therefore the pressure behind the respective end of the spool 31 will cause only partial deflection of the opposite spring and full deflection or movement of the spool 31 will not occur and therefore the fluid flow to the positioning member 11 will be limited. In this manner a certain metering effect is achieved. This metering situation is achieved by a balance of the spring adjustment devices 16, 16*a* and 19, 19*a* such that the movement of the spherical valving member 26 is controlled.

With applicant's device, it is not necessary to provide an independent system for and responsive to changes in attitude of a controlled device by sensing the position of the device and transmitting this information to a second position control unit. By simply inserting applicant's control unit into the lines that will normally control the position of a unit, the control unit will control the flow of hydraulic fluid to the positioning member and maintain the proper attitude.

Although the primary discussion of the device to this point has been the automatic control of attitude and position, it has been previously stated that manual control rods 15, 18 are available to the unit and normally extend therefrom. By manipulation of these control rods, the position of the spool 31 may be controlled and therefore the direction of fluid to the proper side of the positioning member 11 may be controlled with the result being the same as under the automatic operation of the device.

Applicant has provided a unique control unit for maintaining attitude and position of various devices that will be normally responsive to the forces of gravity which unit is subjected to and responsive to the same such forces.

What I claim is:

1. A valve member for maintaining an article at a predetermined level, said valve member including:

a. a body to be mounted for tilting movement and having at least, an inlet, a pair of fluid directing and receiving passages and an outlet;

b. a first valving passage between said inlet and said pair of fluid directing passages;

c. a first spool valve within said first valving passage and permitting communication between said inlet and said fluid directing passages when in a first position and when in a second position permitting communication between said inlet and one of said fluid directing passages while also permitting communication between the other of said fluid directing passages and said outlet;

d. a longitudinally extending, generally cylindrical control passage formed in said body;

e. a generally spherical tilt responsive control member having a diameter less than the diameter of said cylindrical control passage and arranged for rolling movement within said control passage on a surface thereof;

f. resilient means engaging said control member for positioning said control member generally longitudinally centrally of said passage when the valve body is in a level position and permitting said control member to roll within said passage when the body is tilted;

g. a first pair of inlet passages spaced longitudinally within said control passage and opening on said surface and being positioned respectively on either side of said control member when the same is centrally positioned and communicating with said inlet;

h. a first pair of outlet passages spaced longitudinally within said control passage and opening on said surface and being positioned resectively exteriorally of said said pair of inlet passages and communicating with said outlet; and, i. a pair of interconnecting passages communicating respectively with said pair of inlet passages and the ends of said spool valve whereby movement of said control member on said surface to close either of said inlet passages will provide a pressure increase to the respective end of the spool valve to shift the same and direct inlet fluid to one of said fluid directing and receiving passages.

2. The structure set forth in claim 1 and a metering orifice controlling flow from said fluid inlet to said interconnecting passages.

3. The structure set forth in claim 1 and said control member positioning resilient means including biasing means on the respective ends of said control passage.

4. The structure set forth in claim 3 and said biasing means being adjustable.

* * * * *